United States Patent [11] 3,628,972

[72] Inventors Aubrey P. Stewart, Jr.
 Corning;
 Joseph F. Stecker, Creston, both of Iowa
[21] Appl. No. 23,960
[22] Filed Mar. 30, 1970
[45] Patented Dec. 21, 1971
[73] Assignee Allied Chemical Corporation
 New York, N.Y.

[54] STERILIZATION OF MILK PRODUCTS CONTAINING FAT
 7 Claims, No Drawings
[52] U.S. Cl. .................................................. 99/212,
 99/63, 99/151, 99/216
[51] Int. Cl. ....................................................... A23c 3/00
[50] Field of Search ............................................ 99/151,
 212, 211, 215, 216, 63

[56] References Cited
 UNITED STATES PATENTS
 1,243,275 10/1917 Enz ............................. 99/63 X
 1,190,369 7/1916 Beckman et al. ............. 99/63
 1,193,477 8/1916 Crary et al. .................. 99/63
 1,941,243 12/1933 Bergsvik et al. .............. 99/63

Primary Examiner—S. Leon Bashore
Assistant Examiner—Frederick Frei
Attorney—Jonathan Plaut ABSTRACT: An improved process for sterilizing milk and milk products containing fat is provided which comprises continuous injection of fat to milk or milk product which has been continuously preheated and has exited a batch or storage tank followed by sterilization. The process results in a product having smaller fat globules which are dispersed throughout said milk product and permits the elimination of homogenization.

STERILIZATION OF MILK PRODUCTS CONTAINING FAT

This invention relates to the sterilization of products containing fat. More particularly, this invention relates to the sterilization of milk and milk products which contain fat.

It has been the conventional practice to produce sterilized milk or milk products containing fat by heating the milk or milk product together with fat in a batch tank to a temperature of about 100° to 170° F. with violent agitation until the fat is melted followed by the well-known steps of homogenization, sterilization, cooling and packaging. Alternatively, if the batch is so large that it will undergo bacterial or physical breakdown during the holding time between sterilization and packaging, the homogenized fat-milk mixture has been cooled in the batch tank, continually agitated, then sterilized and aseptically packaged when convenient. A chief disadvantage of this procedure is its expense since it is time consuming and requires considerable equipment for heating and cooling as well as agitation.

Still another major disadvantage is the problem of improper fat dispersion. Proper fat dispersion is a highly desirable result since it is required not only to give uniformity to the final product but also to produce a "creamy" texture and opacity in the final product. When fat is mixed with cold milk in the batch tank, large congealed masses of fat are formed which do not disperse readily throughout the milk. There is a marked tendency of the fat to congeal during the cooling of the hot milk-fat mixture and uniform dispersion is particularly difficult. For these reasons, the milk-fat mixtures have been subjected to violent agitation and homogenization to insure uniform dispersion of the fat into the milk. Homogenization has been heretofore necessary not only to aid in uniform fat dispersion but also to insure reduction of fat globule size so that any bacteria in the fat are destroyed during sterilization since larger globules tend to insulate the bacteria from the sterilization treatment.

It is an object of this invention to provide a process for sterilizing milk or milk products so that congealing of fat does not occur and uniform dispersion of said fat in the milk or milk product is accomplished.

It is another object of this invention to provide a process which eliminates the time-consuming and expensive batch heating, cooling, agitation and homogenization steps heretofore employed and equipment therefor.

STill another object of the invention is to provide a process for the more rapid preparation of formulas for sterilization.

These and other objects will be apparent from the following detailed description.

In accordance with the present invention, a process is provided for sterilizing natural and imitation milk products containing fat without the disadvantages of the prior processes which comprises mixing said milk product at a temperature not greater than ambient temperature, preheating said mix prior to addition of fat to a temperature sufficient to melt said fat when added thereto, injecting finely dispersed fat globules throughout said preheated mix while said mix is at the preheat temperature but after said mix has exited the mixing vessel and sterilizing said fat-milk product mixture. More specifically, milk or milk products, whether found from natural milk or a milk substitute, are mixed with other components, if desired, while in a relatively cold to ambient condition, in the batch or storage tank. The cold milk or mixture thereof with other components is pumped continuously through a preheater, which heats the milk to a temperature above the melting point of the fat, generally within the range of about 100° to 170° F. Fat is continuously added to the preheated milk at the exit of the preheater in the desired proportion. Heating means such as a heat coil may be used to preheat the cold milk as desired. Injection means is employed to reduce the liquid fat to tiny globules and disperse it throughout the preheated mix. Such means for example, may be a nozzle which functions to inject the fat globules as desired. The milk-fat mixture is then sterilized, cooled and packaged.

In a more specific embodiment of the invention, the nonsterile cold milk is mixed with sugar, flavors and stabilizers, for example, starch and vegetable gum, to provide a pudding base in a storage tank at a temperature of about 45° F. The cold pudding base is pumped continuously through a continuous preheater, located immediately before a high-temperature, short-time sterilizer, and heated to a temperature of about 130° to 145° F., said temperature being sufficient to melt the fat but below the temperature at which the starch thickens. At the exit of the preheater, fat at a temperature of about 70° F. is injected continuously into the hot pudding base in the proper ratio to fulfill formulation requirements. The temperature at which the fat itself is injected is not critical except that it must be sufficient to maintain the fat sufficiently fluid to be readily pumpable and metered. Similarly, the temperature of the preheated pudding base or milk is not critical as long as it is sufficient to melt the fat. It is desirable, however, that the temperature be insufficient to activate the thickening agent to insure better dispersion of the fat. In general, the milk product, e.g., pudding base, is preheated to a temperature within the range of 100° to 170° F., preferably 130° to 145° F. as indicated above.

After injection of the fat into the preheated mix, the mixture is sterilized. Any of many conventional means may be employed to effect sterilization. In a preferred embodiment herein, the milk-fat mixture is pumped to a steam injector heater which consists of an impeller type pump whereby steam is injected into the product as it is pumped through the heater. Such a steam injector heater is as described in U.S. Pat. No. 3,182,975, to Aubrey P. Stewart and entitled, "Steam Injector Heater." As more fully described therein, the milk-fat product flows from the steam injection heater through a holding pipe to provide a proper holding time at the sterilization temperature to completely sterilize the product. The sterilization temperature and hold time may vary from about 270° to about 300° F. with holding times of about 5 to 90 seconds. The particular temperatures and time may be selected to produce desired characteristics, for example, a particular viscosity, in the final sterilized product as will be appreciated by those skilled in this art. In general, a temperature of about 285° F. and a holding time of 10 seconds is employed.

After sterilization, the product is cooled and aseptically packaged employing any of conventional means well known in this art.

The present invention enables the preparation of a sterile, aseptic milk product of a fat globule size, texture and opacity that is comparable to or superior to those products for example, puddings, manufactured by the conventional batch type preparation involving homogenization and other steps heretofore described.

The process provides fat globules which are smaller in size than those produced if fat is added prior to preheating without injection which permits the production of a move efficiently sterilized product. It has been found that varying the order and means of addition of the fat has a direct effect on the fat globule size as illustrated further hereinbelow. It has been found that even if fat is continuously injected into cold pudding mix prior to preheating as contrasted to after preheating, the same results are not achieved without homogenization after the preheater.

It has further been discovered that injection of fat continuously into the preheated pudding mix has a direct effect on the viscosity of the product. For example, after sterilization and cooling but immediately prior to aseptic packaging, the milk-fat product obtained according to the present invention flowing through the lines to the packaging equipment is of lower viscosity than that of the product obtained by the normal procedure wherein fat is added to the batch tank although the same sterilization temperature and holding time are employed. The final "set-up" viscosities after 48 hours however are comparable. This is a particularly advantageous property since the lower viscosity during cooling of the sterile product permits better efficiency in cooling equipment and eases the requirements on pressures developed by the pumps.

The invention may be better understood from the following examples:

Example 1

A basic pudding mix was prepared containing 70% skim milk, 15% sugar, 5% starch and 10% water at a temperature of 45° F. The mix was passed through a tube and shell preheater and continuously heated to a temperature of 140° F. A vegetable oil (92° F. melting point) was injected continuously through a nozzle as a fine dispersion into the 140° F. basic mix flowing from the preheater but before the high-temperature, short-time (HTST) sterilizer in such proportion as to produce about 5 percent fat in the final mix. This mixture was immediately sterilized by steam injection at a temperature of 278° F. with a 60 second holding time prior to cooling. After cooling to 85° F., the sterile pudding was aseptically packaged. The resulting pudding was of desired opacity, body, texture and mouth feel. Other properties exhibited by the product are listed in the table that follows hereinbelow.

Example 2

For purposes of comparison, the basic pudding mix of example 1 was heated to 130° F. and sufficient fat added in the batch tank to produce a fat content of 5 percent. The mixture was agitated vigorously, homogenized to disperse the fat and cooled to 50° F. The mixture was then preheated to 140° F., sterilized, cooled and aseptically packaged employing the method and conditions, e.g., sterilization temperature, holding time and cooling temperature, as in example 1. The properties exhibited by the product are listed in the table.

In the table, the viscosities of the products being filled into the package after cooling to 85° F. are listed as property A and the viscosity after 48 hours at 72° F. is listed as B.

A comparison of the puddings after 48 hours showed that identical products were obtained in appearance.

The results of a microscopic examination of samples taken immediately before the respective mixes were added to the HTST sterilizer to determine the fat globule size distribution are reflected in the table as C.

The final products after sterilization and aseptic packaging, had identical fat globule size distribution as seen in the table in D.

Thus, it can be seen that an efficient and effective process is provided which eliminates the time and expense of prior art processes yet obtains a product satisfactory in appearance and feel and also accomplishes the highly desirable result of proper fat dispersion, satisfactory fat globule distribution which permits efficient sterilization and low viscosity prior to packaging.

We claim:

1. A process for sterilizing natural and imitation milk products containing fat, said process comprising mixing said milk product comprising cold skim milk, starch and sugar in a mixing vessel at a temperature not greater than ambient temperature, preheating the mix prior to addition of fat but after said mix has exited the mixing vessel, to a temperature sufficient to melt said fat when added thereto, injecting finely dispersed fat globules throughout said preheated mix while said mix is at the present temperature and sterilizing the fat-milk product mixture thus obtained.

2. A process as claimed in claim 1 wherein said mix with fat dispersed throughout is cooled before sterilizing.

3. A process as claimed in claim 1 wherein said milk product is preheated to a temperature within the range of 100° to 170° F.

4. A process as claimed in claim 1 wherein said milk product is mixed at 45° F., and preheated to a temperature of about 130° to 145° F.

5. A process as claimed in claim 4 wherein said milk product with fat dispersed throughout is cooled to about 85° F. before sterilizing.

6. A process as claimed in claim 4 wherein said milk product with fat dispersed throughout is charged to a steam injector heater whereby steam is injected into said product to effect sterilization.

7. A process as claimed in claim 6 wherein said milk product with fat dispersed throughout is sterilized at a temperature within the range of about 270° to about 300° F.

* * * * *

| Property | Example 1 | Example 2 |
| --- | --- | --- |
| (A) Viscosity at 85° F. (prior to packaging) | 14,000 cps | 30,000 cps. |
| (B) Viscosity at 72° F. after 48 hours | 92,000 cps | As in Example 1. |
| (C) Fat globule size distribution before sterilization. | 50% in 6-12 micron range, 50% in 1-2 micron range. | 75% in 10-20 micron range, 15% in 5-10 micron range, 10% in 2-3 micron range. |
| (D) Fat globule size distribution after sterilization and packaging. | 10% in 6-10 micron range, 90% in 1-2 micron range. | As in Example 1. |